Figure 1:
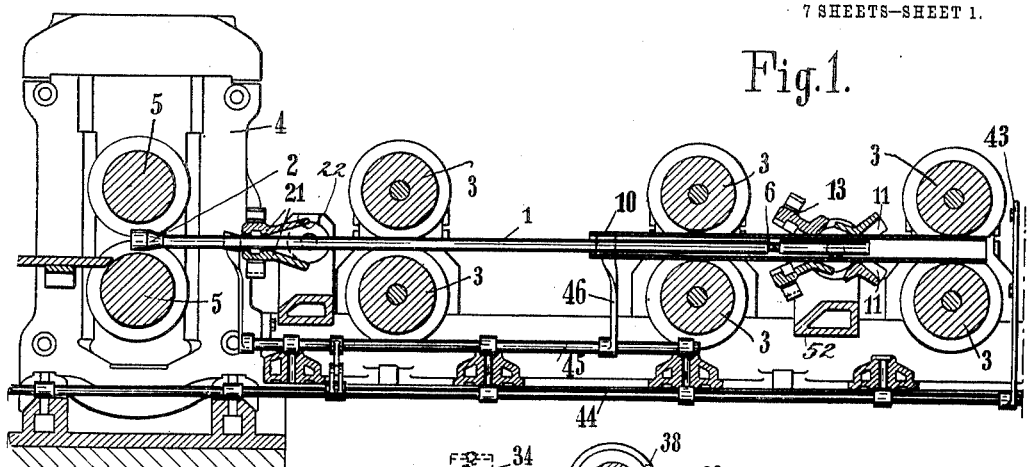

H. STÜTING.
ROLL TRAIN FOR ROLLING OUT HOLLOW BILLETS OR TUBES.
APPLICATION FILED FEB. 24, 1910.

1,009,937.

Patented Nov. 28, 1911.

7 SHEETS—SHEET 1.

Witnesses:
G. Hayman
F. Kasper

Inventor:
Heinrich Stüting
by B. Singer
Attorney.

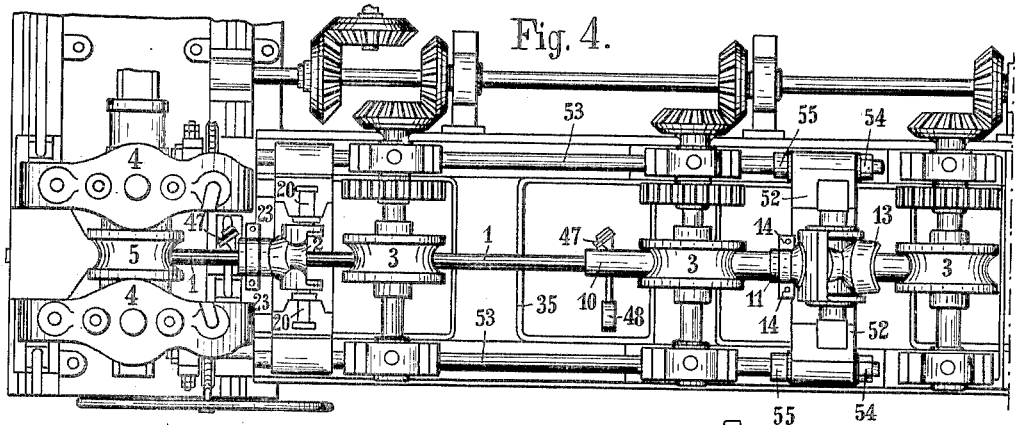
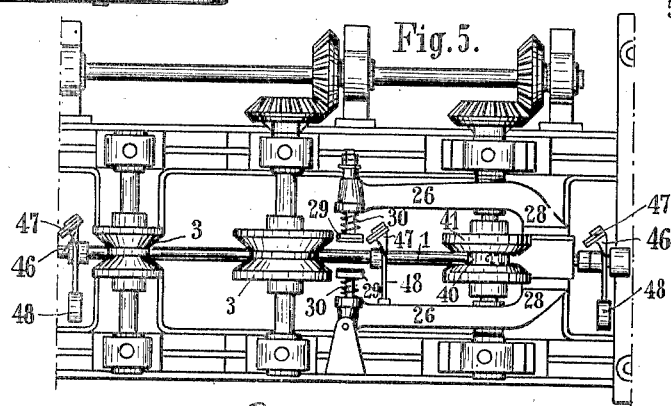
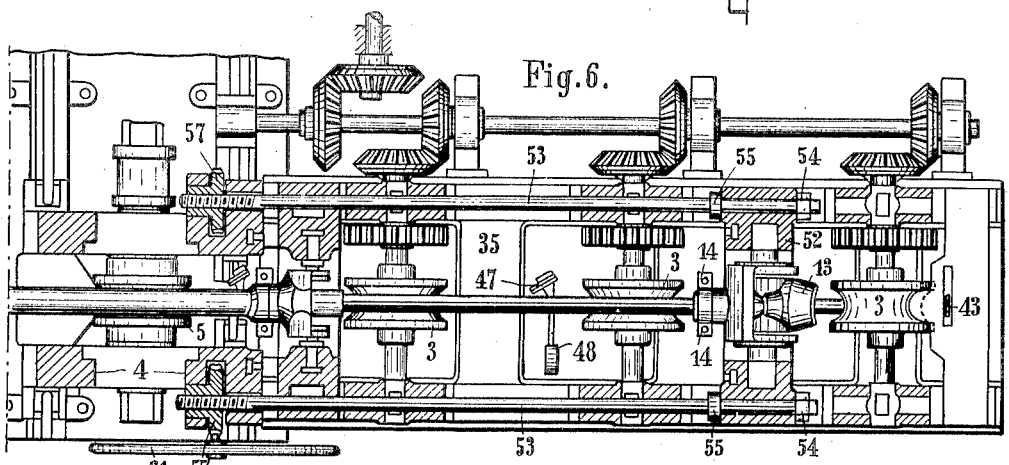

H. STUTING.
ROLL TRAIN FOR ROLLING OUT HOLLOW BILLETS OR TUBES.
APPLICATION FILED FEB. 24, 1910.

1,009,937.

Patented Nov. 28, 1911

7 SHEETS—SHEET 3.

Witnesses:
G. Hayman
F. Kasper

Inventor:
Heinrich Stüting
by B. Singer
Attorney.

H. STÜTING.
ROLL TRAIN FOR ROLLING OUT HOLLOW BILLETS OR TUBES.
APPLICATION FILED FEB. 24, 1910.

1,009,937.

Patented Nov. 28, 1911.

7 SHEETS—SHEET 4.

Witnesses:
G. Hayman.
F. Kasper.

Inventor:
Heinrich Stüting
by B. Singer
Attorney.

H. STÜTING.
ROLL TRAIN FOR ROLLING OUT HOLLOW BILLETS OR TUBES.
APPLICATION FILED FEB. 24, 1910.

1,009,937.

Patented Nov. 28, 1911.

7 SHEETS—SHEET 5.

Witnesses:
G. Hayman
H. Kasper

Inventor:
Heinrich Stüting
by B. Singer
Attorney

H. STÜTING.
ROLL TRAIN FOR ROLLING OUT HOLLOW BILLETS OR TUBES.
APPLICATION FILED FEB. 24, 1910.

1,009,937.

Patented Nov. 28, 1911.

7 SHEETS—SHEET 7.

Witnesses
G. Hayman
F. Kasper.

Inventor:
Heinrich Stüting
by B. Singer.
Attorney.

UNITED STATES PATENT OFFICE.

HEINRICH STÜTING, OF WITTEN, GERMANY.

ROLL-TRAIN FOR ROLLING OUT HOLLOW BILLETS OR TUBES.

1,009,937.  Specification of Letters Patent.  Patented Nov. 28, 1911.

Application filed February 24, 1910. Serial No. 545,648.

*To all whom it may concern:*

Be it known that I, HEINRICH STÜTING, director, a citizen of the German Empire, residing at Witten-on-the-Ruhr, in the Kingdom of Prussia, Germany, have invented certain new and useful Improvements in Roll-Trains for Rolling Out Hollow Billets or Tubes; and I do hereby declare the following to be a full and exact description of the invention, such as will enable others skilled in the art to which it appertains to make and use the same.

My invention relates to improvements in roll trains for rolling out hollow billets or tubes, such as are particularly used in the manufacture of seamless tubes.

One of the objects of the improvements is to provide a roll train in which the rolling operation is entirely automatic.

A further object of the improvement is to so arrange the stem of the mandrel used in my improved roll train, that the said stem is subjected only to tensile strain. For this purpose the said stem extends from the mandrel and reducing rolls toward the feeding side of the roll train. To prevent the said stem from being taken along by the hollow billet or tube during its passage through the feeding and reducing rolls, holding devices are provided which are so constructed, that they are automatically opened by the blank passing through the same, and automatically closed on the stem after the passage of the blank. In the preferred form two holding devices are provided in my improved roll train, one of which engages the stem at a point near the mandrel and reducing rolls, while the other one engages the rear end of the stem. The location of the said stem holding devices is such, that one of them is always in operative or holding position. At the rear of the reducing rolls, automatic turning mechanism is provided whereby the blank is turned through an angle of about 90 degrees, before it is fed to a second set of reducing rolls, to which the said blank may be fed by means, similar to the feeding and holding means provided in combination with the first set of reducing rolls.

A further object of the improvements is to provide automatic blocking means for my improved roll train whereby a second tube is prevented from being slipped onto the stem of the mandrel before the previously rolled blank has entirely left the said roll train.

For the purpose of explaining the invention, an example embodying the same has been shown in the accompanying drawings, in which the same characters of reference have been used in all the views to indicate corresponding parts.

Figure 2:
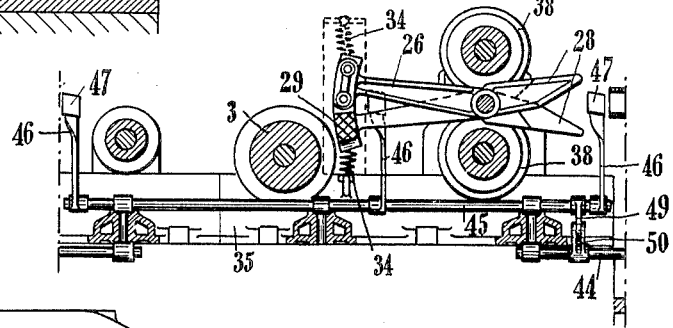
Figure 3:
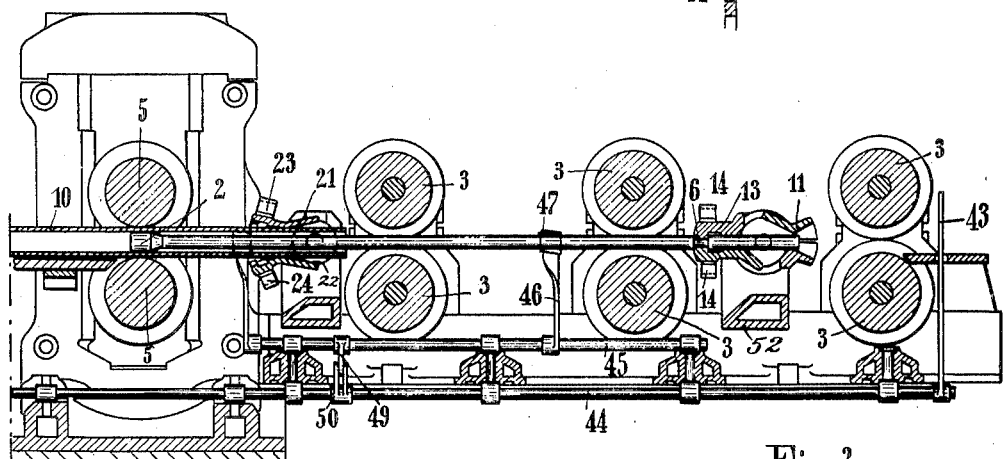
Figure 7:
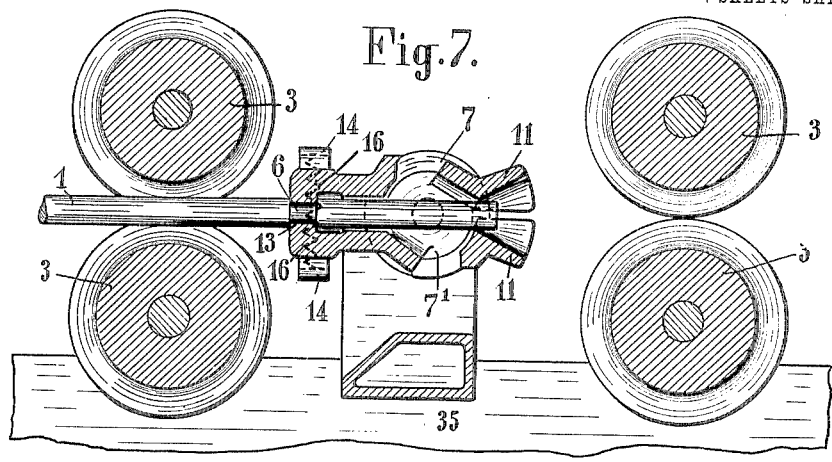
Figure 8:
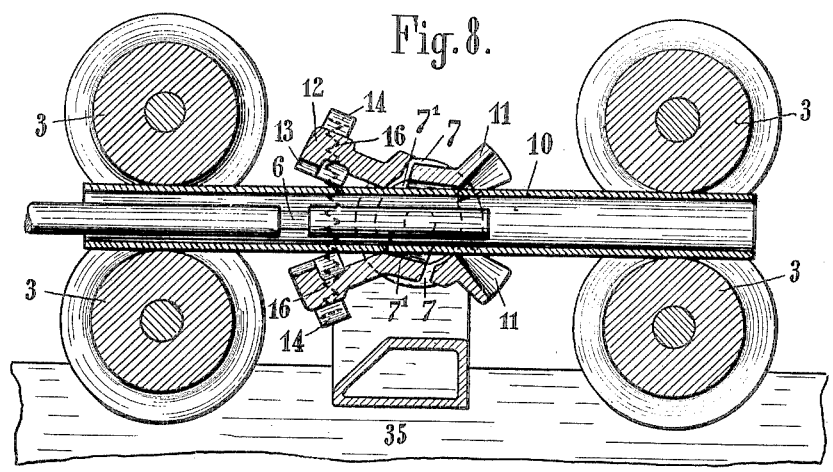
Figure 9:
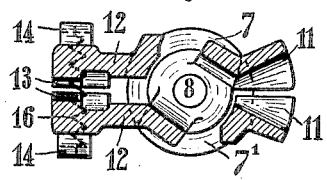
Figure 10:
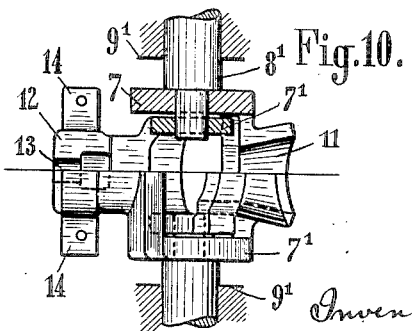
Figure 11:
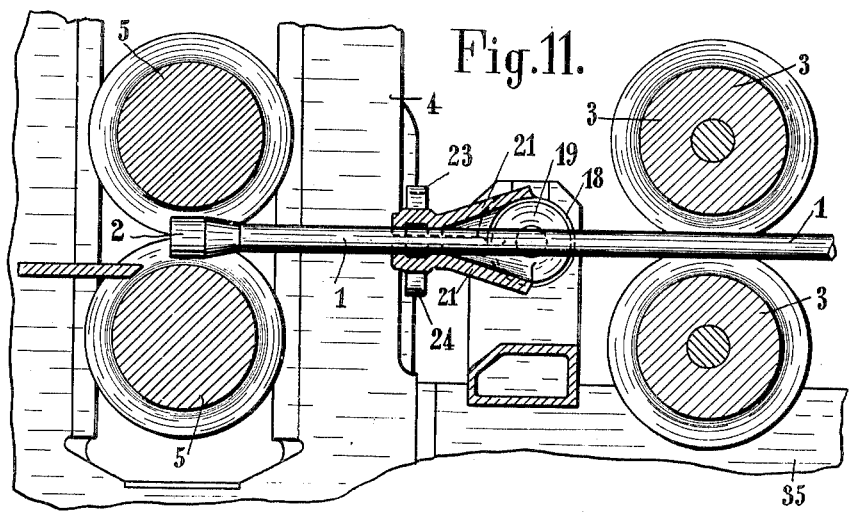
Figure 12:
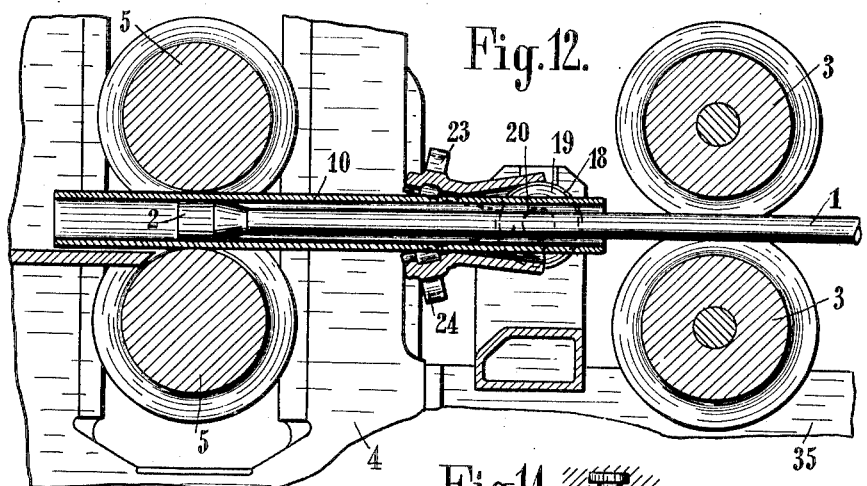
Figure 13:
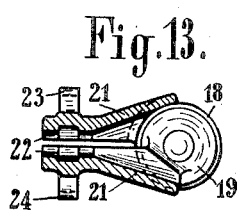
Figure 14:
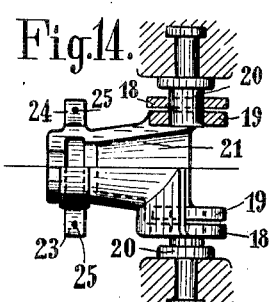
Figure 15:
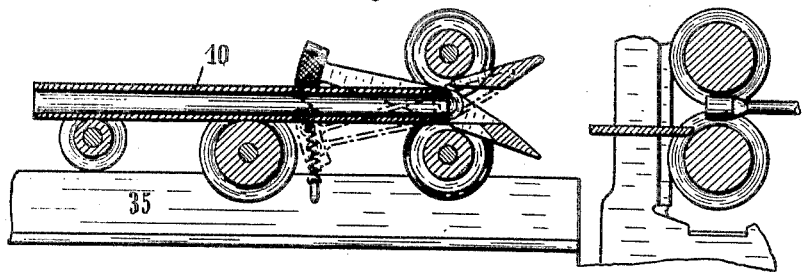
Figure 16:
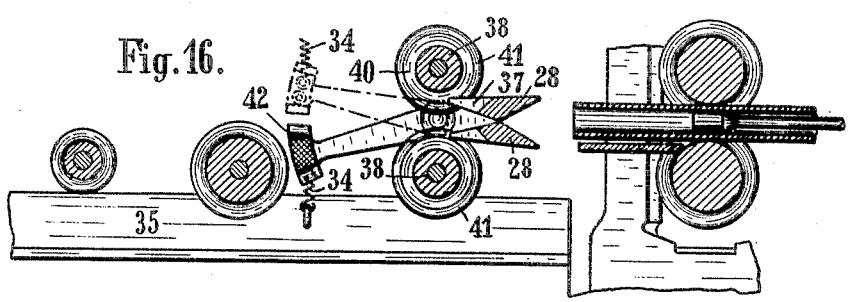
Figure 17:
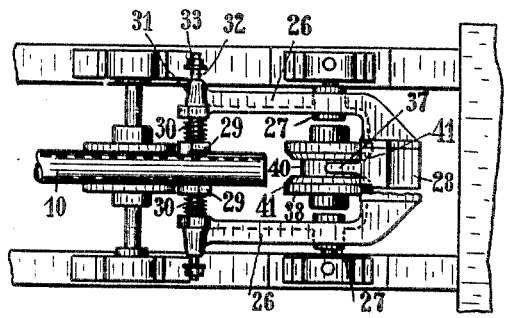
Figure 18:
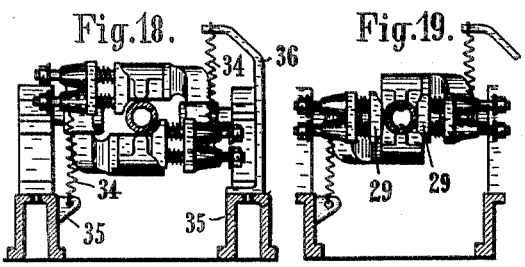
Figure 19:
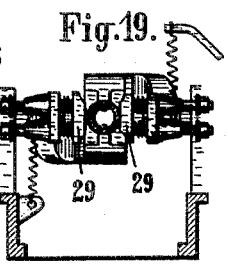
Figure 20:
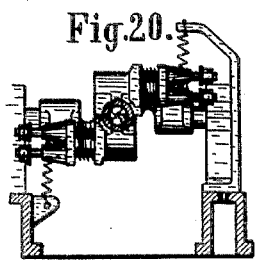
Figure 21:
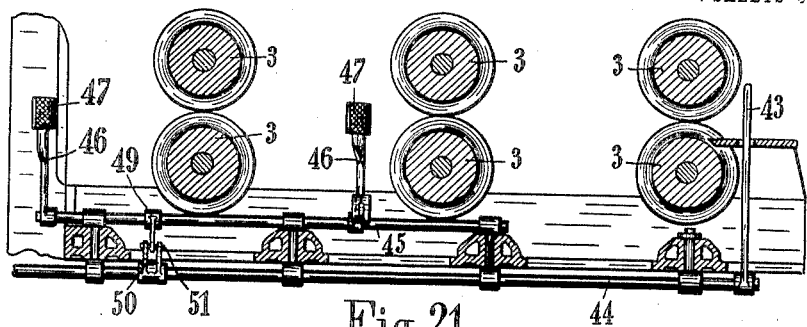
Figure 22:
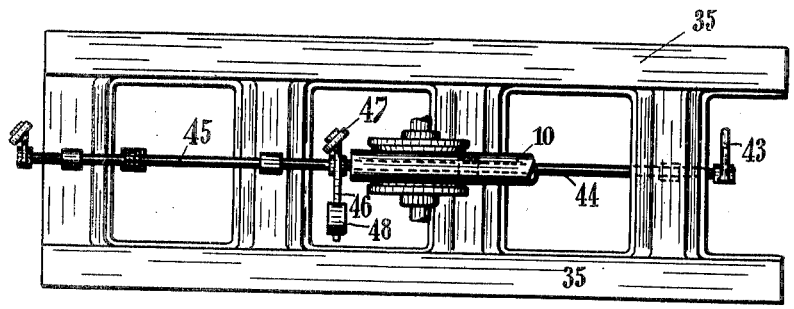
Figures 23, 24:
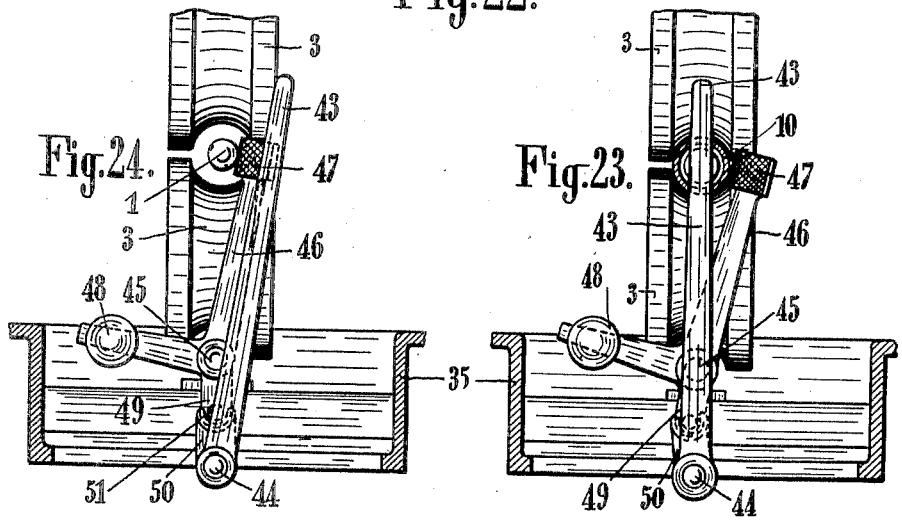
Figure 25:
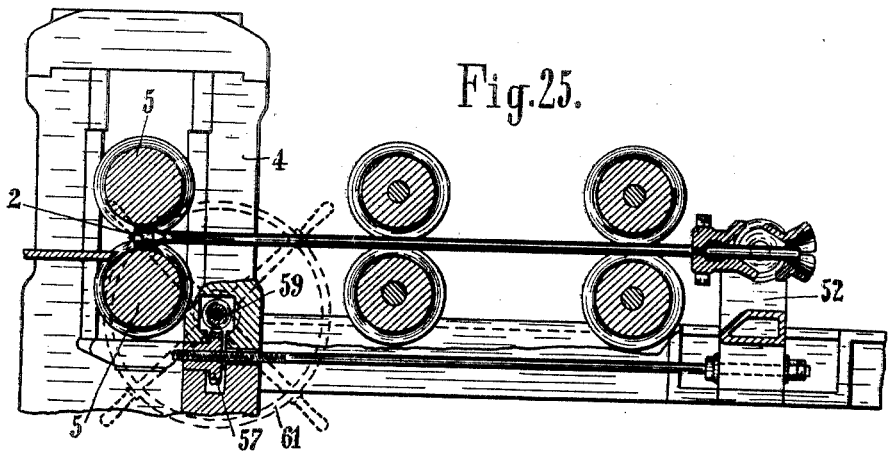
Figure 26:
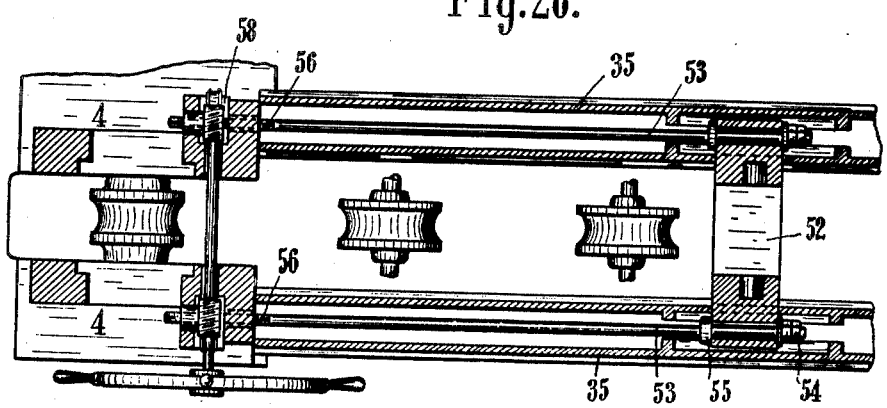
Figure 27:
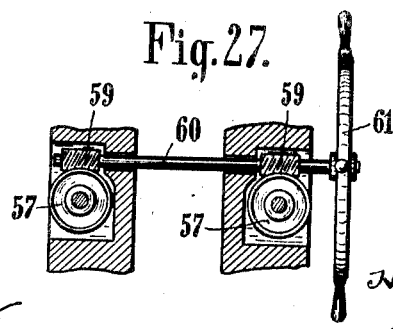

In said drawings—Figures 1 and 2 are a side view of a complete roll train, Fig. 1 showing the left hand part, and Fig. 2 the right hand part of the same, Fig. 3, is a similar side view of the part of the roll train shown in Fig. 1, with a billet or tube passing through the reducing rolls, Figs. 4 and 5, are, respectively, plan views of the parts of the roll train shown in Figs. 1 and 2, with a tube or billet passing through the first holding mechanism, Fig. 6, is a plan partly in section of Fig. 3, Fig. 7, is a vertical cross-section of the first holding mechanism for the stem of the mandrel and of the adjacent rolls, Fig. 8, is a similar cross-section with a blank passing through the holding mechanism, Fig. 9, is a detail sectional view of the tongs of the holding mechanism, the tongs being shown in their closed position, Fig. 10, is a plan, partly in section, of the tongs shown in Fig. 9, Fig. 11, is a vertical cross-section of the reducing rolls and the second stem holding mechanism, Fig. 12, is a similar cross-section of the parts shown in Fig. 11, with a tube passing through the tongs shaped holding mechanism located in front of the reducing rolls, Fig. 13, is a detail sectional view of the holding device illustrated in Figs. 11 and 12, Fig. 14, is a plan, partly in section, of the device shown in Fig. 13, Fig. 15, is a vertical longitudinal section of a blank turning mechanism located immediately at the rear of the reducing rolls, the mechanism being in a position immediately preceding a turning operation, the parts shown in broken lines being in front of the plane of the drawing, Fig. 16, is a similar longitudinal section showing the turning mechanism in an initial position and a tube passing through the reducing rolls, Fig. 17, is a plan of the turning mechanism, the parts being shown in their positions after a turning operation, Figs. 18, 19 and 20, are cross-sections of the roll train, showing end views of the turning mechanism, Fig. 18 showing the tongs in their positions before turning a blank, Fig. 19, showing the same in their positions while turning a blank through an angle of 90 degrees, and Fig. 20, showing the tongs in their positions after turning a blank, Fig. 21, is a longitudinal section of the roll train, and a side view of the blocking mechanism, Fig. 22, is a plan of Fig. 21, Fig. 23, is a cross-section of the roll train, showing a side view of the blocking lever seen in the direction of the feed of the tube, the said lever being in its operative or blocking position, Fig. 24, is a similar cross-section showing the blocking lever in its initial position, and Figs. 25 to 27, show the mechanism for adjusting the stem of the mandrel, Fig. 25 being a side view of the adjusting mechanism partly in section, Fig. 26, a horizontal section of the same, and Fig. 27 a vertical cross-section of the adjusting mechanism.

In the example shown in the drawings, the roll train consists of pairs of feed rolls 3 and reducing rolls 5 mounted in any suitable way in frames 4. The mandrel 2 is located within the pass of the said reducing rolls 5, and it is secured to a stem 1 extending toward the feed end of the roll train. At its end opposite to the mandrel 2 the stem 1 is formed with an annular groove 6 providing a shoulder for the hook shaped ends of a holding mechanism for the stem 1.

In the example, as shown in Figs. 7 to 9, the first holding mechanism consists of two rocking members connected with each other in the manner of tongs. Each member of the said tongs consists of a disk 7 having a shaft 8 formed centrally on its outer face. It may be stated here that as shown in Fig. 10 the said disk is formed with a central bore providing a suitable bearing for studs 8' mounted in a bearing 9' and providing a rocking support for the members of the tongs. In the preferred form, each of the members of the tongs is formed with two disks 7' one on each side, and mounted on the studs 8', as is shown in Fig. 10. Internally the tongs are made hollow so that the tube 10 can pass through the same. To permit the passage of the tube, each disk is formed with a shank or extension 11, so that the mouth of the tongs can be opened by the tube, and at diametrically opposite parts of the disks, arms 12 are provided, which form a part of the mouth of the tongs. The extensions or shanks 11 are provided with internally curved faces corresponding to the form of the tube. To enable separation of the shanks 11, when the tube is inserted between the same, the curved faces of the said extensions are made tapering from their outer ends toward the center of the tongs, so that the shanks 11 act in the manner of wedges. Therefore the cavity formed by the shanks when in their closed position is substantially conical. The shanks of the tongs are so disposed relatively to each other and to the tube passing between the same, that one of them surrounds the said tube from its upper side and the other one from the lower side. The arms 12 are curved in a way similar to the curve of the shanks 11, but at their ends they are provided with flanges 13 which extend inward and toward the stem 1, and which are adapted to engage the annular groove of the stem 1 so that it is not advanced by the friction of the tube passing through the same. The shanks 12, 12 are formed with lateral ears 14, 14 to which springs 16, 16 are attached. The latter have the tendency to close the tongs 12, 13, and they are tensioned when the shanks 11, 11 are separated by the tube 10 passing through the same. A similar holding mechanism is provided in front of the reducing rolls 5 and the elements of the said holding mechanism are indicated by the numerals 21, 22 and 23. The holding mechanism 12, 13, which is located at the inlet end of the roll train, must withstand a stronger pull of the stem 1 than the holding mechanism 21, 22, 23, because its function is to hold the stem 1 while the tube 10 passes between the reducing rolls, and in contact with the mandrel 2, where its friction is greater, than when merely passing over the stem 1. As the strain exerted on the second holding mechanism is considerably less than that exerted on the first holding mechanism, it is of lighter construction, and is illustrated in Figs. 11 to 14. As shown, it consists of two members made integral with lateral disks 18, 19. The said disks are formed with central bores whereby they are mounted on stationary shafts 20. The shanks 21 are formed with conical hollow portions, and at their forward ends with a cylindrical portion adapted to embrace the tube. On account of its conical rear portion the holding device can be separated by the tube and by means of the cylindrical portion it can clamp the stem 1, while the tube passes over the stem 1 and holds the first holding device in its open or inoperative position. The bite of the tongs is effected by means of springs 25, 25 which are attached to ears 23, 24 of the shanks 21, 21. After having passed the reducing rolls, the tube passes through a turning mechanism which is also constructed in the form of tongs, as appears from Figs. 2, 5 and 15 to 20. The members of the said turning device are substantially of the same construction. Each member consists of a rocking lever 26 having a fulcrum on a shaft 27 which is preferably stationary, the levers being loosely mounted thereon. At the end of their short arms the said levers are made integral with wedge shaped guide faces 28 arranged to be acted upon by the tube and to open the turning device. At the end of their long arms the said levers are provided with clamping jaws 29 which are normally forced inward and against the tube 10 by springs 30.

In Fig. 17 I have shown a suitable construction of the connection between the clamping jaws and the long arm of the turning tongs. As shown, through an eye 31, formed at the end of the arm 26, there extends a stem 32, of the clamping jaw 29, which at its outer end projects beyond the said eye. To the end of the stem 32 a nut 33 is screwed which provides a means to regulate the tension of the spring and also forms a rear abutment for limiting the throw of the clamping jaws toward the tube 10. At one of its ends the said spring bears against the clamping jaw and at the other end against a flange formed on the eye 31. The arms are held in their normal positions by means of springs 34 which are attached at one of their ends to the arms. At the other end one of the springs is attached to the frame 35 or to a bracket mounted thereon, while the other spring is connected to an arm extending from said frame upward, as is shown in Figs. 18 to 20. In the normal position of the tongs the springs have no tention, but when the shanks are moved into their operative positions the springs are put under tension. Obviously the tube 10 must be relieved of any clamping pressure before being turned. Therefore the tube must have left the short shanks 28 of the turning device before the turning mechanism is thrown into operation. But as soon as the tube has left the arms 28 the springs 34 will be free to act on the tube. However in this position the tube is still held between the rolls 38 so that it cannot be freely rotated. If in this position of the tube the turning device is thrown into operation, its arms are rocked into inoperative position without turning the tube. Therefore in order to avoid such premature turning operation both wedge shaped faces 28 are provided with an elongated portion constructed in the form of a tongue 37 which is directed toward the guide rolls 38 and extends substantially to the axis of their pass, and in order to be out of the path of the tube, the said tongues engage in grooves 40 formed on the said rolls. Therefore the tube bears only on the conical faces 41 of the rolls while it is within the tongs. As soon as the outer end of the tube has passed beyond a line joining the axis of the rolls 38, the tube is released from the clamping action of the said rolls. In this position the tube leaves the tongue 37 and the released short arms are forced toward each other by the springs 34. Thereby the clamping jaws 29 are moved back from their rocked positions shown in Figs. 15, 16 and 18, into the positions shown in Fig. 19, in which they engage the tube by friction, and finally into their normal position shown in Fig. 20. During such movement of the arms 26, and their clamping jaws 29, the tube is turned through an angle of 90 degrees. To enable the clamping jaws to securely hold the tube, they are formed with guide faces 42 which are arranged to act on the outer surface of the tube and to force the jaws backward against the tension of their springs 30. Thereby a reliable bite of the jaws on the tube is assured. The ratio of the lengths of the arms 28 and 26, is such, that when spreading, the arms 28, the outer ends of the shanks 26 pass each other, and the upper clamping jaws are moved downward and the lower clamping jaws upward. During the turning operation the clamping jaws are moved in opposite directions. During such operation the clamping jaws are only temporarily in contact with the tube. The breadth of the clamping jaws is such that the tube is turned through an angle of about 90 degrees. The angle of the rotation of the tube is different for tubes of different diameters. The greater the circumference of the tube the less the angle, and the smaller the circumference of the tube, the greater the angle, provided that the breadth of the clamping jaws is the same for all the tubes.

The operation of the roll train is as follows: Referring to Fig. 1, the tube or billet 10 is fed from the right between the first pair of rolls 3, and it is advanced by the said rolls between the conical portion 11 of the first holding device for the stem 1 of the mandrel and about the stem. When passing between the faces 11, 11 the tube or billet 10 spreads the tongs, and the hook shaped projections 13 are disengaged from the annular groove formed in the stem so as to release the latter. However, the said stem is in the meantime held by the second holding device 21, so that the tube or billet can be further advanced through the second pair of rolls 3, 3. The third pair of rolls 3, 3 advances the tube or billet between the conical faces 21 of the second holding device, but not until the billet has completely released the first holding device, so that the hook shaped projections 13 of the said holding device are again thrown, by the springs 16, into engagement with the annular groove of the stem, so as to rigidly hold the said stem. By passing between the conical faces 21, the tube opens the tongs, so that it can freely advance into the pass of the reducing rolls 5, 5. Within the latter the tube is drawn over the mandrel 2 and enlarged accordingly. As soon as the tube has been released from the rolls 5, 5, or when only its rear end is between the said rolls, the forward end of the tube advances between the wedge shaped faces of the turning tongs 26, 28. By spreading the arms 28 of the latter the arms 26 and their clamping jaws 29 are moved into their operative positions shown in Fig. 18, as has been described above. The rolls 38 advance the tube farther, and finally the rear end of the tube leaves the said rolls and simultaneously releases the shanks 28. Now the springs 34 are thrown into action and the clamping jaws 29 are pressed against the tube and turn the same whereupon the tube is, in the same way advanced to the next rolls.

From the above description of the operation of the roll train it will readily appear that the stem 1 of the mandrel is not subjected to axial compression, but only to axial tension. In operating my improved roll train the stem of the mandrel must always be engaged by either one of the holding devices 11, 13 or 21, 22, because otherwise the mandrel 2 would be displaced from its correct position between the rolls 5, 5. If now a second billet were inserted between the rolls 3, 3 so as to open the tongs 11, 13 while the previously inserted billet has not yet released the tongs 21, 22, the mandrel would not be held by any of the holding devices, and it would therefore be shifted. In order to make it impossible to insert a second tube into the roll train before the tube which is being rolled has released the tongs 21, 22, I provide blocking means for the roll train. The said blocking means comprises a blocking lever 43 which is secured to a rock shaft 44 mounted in suitable bearings provided below the base plate 35 of the roll train. Above the said base plate there is a second rock shaft 45 which is provided with a plurality of properly spaced arms 46 carrying at their upper ends deflecting plates 47 disposed angularly to the axis of the shaft 45. By means of the said plates the levers 46 are rocked laterally by the forward end of a billet or tube striking against the same, as is shown in Fig. 23. The rocking movement of the lever 46 is transmitted to the blocking lever 43 through a short arm 49 carrying a pin 51 which engages in a notch of an arm 50 secured to the shaft 44. When the plate 47 has been released from the tube it is moved backward into its normal position in contact with the stem 1 of the mandrel by means of a weighted lever 48. In the preferred form shown in the drawings the arm 48 and the arm 49 are made integral with the lever 46.

The operation of the blocking apparatus is as follows: While the plate 47 is in contact with the stem 1 of the mandrel the pin 51 engaging in the notched portion of the arm 50 holds the latter and the shaft 44 in such a position that the blocking lever 43 is out of the path of the tube or billet. When however the lever 46 is rocked by the tube 10 into the position shown in Fig. 23, the lever 43 is rocked into the path of the tube so that a tube can not be advanced into the roll train.

In my improved roll train means are provided whereby an extension of the stem 1 of the mandrel caused by the heat imparted thereto by the red hot tube is compensated for, so that the mandrel 2 can be adjusted in its correct position relatively to the pass of the said rolls 5, 5. For this purpose the stem of the mandrel is attached to a bearing block 52 which is slidable in suitable guide ways provided on the base plate 35. To provide for a simultaneous and uniform adjustment of both sides of the said bearing block while the roll train is in operation, rods 53 are secured to the block 52. At their opposite ends the rods 53 are provided with screw threads which engage in internally screw threaded worm gears 57 mounted in suitable cavities 58 of the frame 4 in such a way as to be secured against longitudinal displacement. The worm gears 57 are in engagement with worms 59 secured to a common shaft 60 and adapted to be rotated by a hand wheel 61.

The operation of the stem adjusting device is as follows: If the attendant sees that the mandrel 2 needs adjustment relatively to the pass of the rolls 5, 5 he turns the hand wheel in the proper direction so that the rods 53, the bearing block 52 and the stem 1 are shifted until the mandrel assumes its correct position relatively to the pass of the rolls 5, 5. The pitch of the worms 59 can be made sufficiently small to make them self locking. By the mechanism described the bearing block 52 and the mandrel can be adjusted as accurately as is necessary, though the time of such adjustment be somewhat increased as compared to other adjusting devices the operation of which can be effected in a more speedy way. Furthermore, special locking means for the adjusting device are dispensed with.

I claim herein as my invention:

1. In a roll train, for rolling out tubes or hollow billets, the combination with the reducing rolls, and means for feeding a blank to be rolled to said rolls, of a mandrel, a stem for said mandrel extending from the reducing rolls toward the tube feeding side of the roll train, and means to hold said stem, said holding means being adapted to be opened by the blank to permit the passage of the same.

2. In a roll train for rolling out tubes or hollow billets, the combination with the reducing rolls, and means for feeding a blank to be rolled to said rolls, of a mandrel, a stem for said mandrel extending from the reducing rolls toward the tube feeding side of the roll train, holding means arranged to hold the stem at the end away from the mandrel, and holding means arranged to engage the stem at a point near the mandrel, both holding means being adapted to be opened by the blank to permit the passage of the same.

3. In a roll train, for rolling out tubes or hollow billets, the combination with the reducing rolls, and means for feeding a blank to be rolled to said rolls, of a mandrel, a stem for said mandrel extending from the reducing rolls toward the tube feeding side of the roll train, holding means arranged to hold the stem at the end away from the mandrel, and holding means arranged to engage the stem at a point near the mandrel, both holding means being adapted to be opened by the blank to permit the passage of the same.

4. In a roll train for rolling out tubes, or hollow billets, the combination with the reducing rolls, and means for feeding a blank to be rolled to said rolls, of a mandrel, a stem for said mandrel extending from the reducing rolls toward the tube feeding side of the roll train, tongs shaped holding means arranged to hold the stem at the end away from the mandrel, and tongs shaped holding means arranged to engage the stem at a point near the mandrel, both holding means being adapted to be opened by the blank to permit the passage of the same.

5. In a roll train for rolling out tubes or billets, the combination with the reducing rolls, a mandrel, and the stem for the mandrel extending from said mandrel toward the feeding side of the roll train, of a pair of tongs adapted to engage the said stem and to hold the same, each of the tong members of the said tongs being formed with a rearward extension flaring outward and away from the stem and adapted to be engaged by the blank fed to the roll train and to be rocked thereby so as to open the tongs and to permit the passage of the blank through the tongs.

6. In a roll train for rolling out tubes or hollow billets, the combination with the reducing rolls, a mandrel, and a stem extending from said reducing rolls toward the feeding side of the roll train, of two holding devices for the stem one at the end away from the mandrel and one at a point near the same, said holding devices being adapted to be opened by a blank passing through the roll train, a blocking mechanism adapted to prevent a blank from being fed to the roll train, and means provided at the rear of the second stem holding device to hold the blocking mechanism in blocking position.

7. In a roll train for rolling out tubes or hollow billets, the combination with the reducing rolls, a mandrel, and a stem extending from said reducing rolls toward the feeding side of the roll train, of two holding devices for the stem one at the end away from the mandrel and one at a point near the same, said holding devices being adapted to be opened by a blank passing through the roll train, a blocking mechanism adapted to prevent a blank from being fed to the roll train, and means provided at the rear of the first and second stem holding device to hold the blocking mechanism in blocking position.

8. In a blocking mechanism for roll trains, the combination with a blocking rod adapted to be rocked into blocking position, a rocking lever formed with a surface disposed angularly in the path of the blank to be rolled, and an operative connection between said rocking lever and blocking rod adapted to throw said blocking rod into blocking position when the rocking lever is being rocked by the blank.

In testimony whereof I hereunto affix my signature in the presence of two witnesses.

HEINRICH STÜTING.

Witnesses:
 WOLDEMAR HAUPT,
 HENRY HASPER.